(12) United States Patent
Lounibos et al.

(10) Patent No.: US 9,990,110 B1
(45) Date of Patent: Jun. 5, 2018

(54) PRIVATE DEVICE CLOUD FOR GLOBAL TESTING OF MOBILE APPLICATIONS

(75) Inventors: Thomas M. Lounibos, San Francisco, CA (US); Kenneth C. Gardner, Palo Alto, CA (US); Tal Broda, Sunnyvale, CA (US); Giri B. Senji, San Ramon, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 243 days.

(21) Appl. No.: 13/435,976

(22) Filed: Mar. 30, 2012

Related U.S. Application Data

(63) Continuation-in-part of application No. 12/927,426, filed on Nov. 15, 2010, now Pat. No. 8,306,195, which is a continuation of application No. 11/503,580, filed on Aug. 14, 2006, now Pat. No. 7,844,036.

(51) Int. Cl.
  *G06F 3/048* (2013.01)
  *G06F 3/0484* (2013.01)

(52) U.S. Cl.
  CPC ................. *G06F 3/0484* (2013.01)

(58) Field of Classification Search
  CPC ....... G06F 3/00; G06F 11/3664; G06F 11/368
  USPC ........................ 715/738, 752, 863
  See application file for complete search history.

(56) References Cited

U.S. PATENT DOCUMENTS

| | | | |
|---|---|---|---|
| 5,414,809 A | 5/1995 | Hogan et al. | |
| 5,615,347 A | 3/1997 | Davis | |
| 5,724,525 A * | 3/1998 | Beyers et al. | 705/40 |
| 5,945,986 A | 8/1999 | Bargar et al. | |
| 6,025,853 A | 2/2000 | Baldwin | |
| 6,092,043 A | 7/2000 | Squires et al. | |
| 6,134,582 A * | 10/2000 | Kennedy | G06Q 10/107 709/203 |
| 6,317,786 B1 | 11/2001 | Yamane et al. | |
| 6,434,513 B1 | 8/2002 | Sherman et al. | |

(Continued)

OTHER PUBLICATIONS

Chester et al., "Mastering Excel 97", 1994, Sybex, 4th Ed., pp. 1016, 136-137, 430, 911, 957-958.

(Continued)

*Primary Examiner* — Amy Ng
*Assistant Examiner* — Meseker Takele
(74) *Attorney, Agent, or Firm* — The Law Offices of Bradley J. Bereznak

(57) ABSTRACT

A system for worldwide cloud-based testing of mobile applications includes a plurality of mobile computing devices geographically distributed across a plurality of different countries. One or more servers are connected with the mobile computing devices over one or more networks. The one or more servers run a program for playback of a test composition which includes a timed sequence of clips on the mobile computing devices. The timed sequence of clips include one or more messages each of which instructs a precise gesture-based action applied to at least one object displayed on the touch-sensitive display screen. The precise gesture-based action corresponds to a functional aspect of the mobile application and consists of a plurality of data elements previously captured from inside the mobile application while the mobile application was subject to the gesture-based user input entered via the touch-sensitive display screen.

23 Claims, 12 Drawing Sheets

(56) References Cited

U.S. PATENT DOCUMENTS

| | | |
|---|---|---|
| 6,477,483 B1 | 11/2002 | Scarlat et al. |
| 6,542,163 B2 | 4/2003 | Gorbet et al. |
| 6,560,564 B2 | 5/2003 | Scarlat et al. |
| 6,563,523 B1 | 5/2003 | Suchocki et al. |
| 6,601,020 B1* | 7/2003 | Myers .................. 702/186 |
| 6,738,933 B2 | 5/2004 | Fraenkel et al. |
| 6,792,393 B1 | 9/2004 | Farel et al. |
| 6,817,010 B2 | 11/2004 | Aizenbud-Reshef et al. |
| 6,898,556 B2 | 5/2005 | Smocha et al. |
| 6,959,013 B1 | 10/2005 | Muller et al. |
| 6,975,963 B2 | 12/2005 | Hamilton et al. |
| 7,050,056 B2 | 5/2006 | Meyringer |
| 7,133,805 B1 | 11/2006 | Dankenbring et al. |
| 7,216,168 B2 | 5/2007 | Merriam |
| 7,334,162 B1 | 2/2008 | Vakrat et al. |
| 7,376,902 B2 | 5/2008 | Lueckhoff |
| 7,464,121 B2 | 12/2008 | Barcia et al. |
| 7,478,035 B1 | 1/2009 | Wrench et al. |
| 7,548,875 B2 | 6/2009 | Mikkelsen et al. |
| 7,587,638 B2 | 9/2009 | Shah et al. |
| 7,594,238 B2 | 9/2009 | Takahashi |
| 7,607,169 B1 | 10/2009 | Njemanze et al. |
| 7,617,201 B1 | 11/2009 | Bedell et al. |
| 7,630,862 B2 | 12/2009 | Glas et al. |
| 7,685,234 B2 | 3/2010 | Gottfried |
| 7,689,455 B2 | 3/2010 | Fligler et al. |
| 7,693,947 B2 | 4/2010 | Judge et al. |
| 7,725,812 B1 | 5/2010 | Balkus et al. |
| 7,743,128 B2 | 6/2010 | Mullarkey |
| 7,757,175 B2 | 7/2010 | Miller |
| 7,844,036 B2* | 11/2010 | Gardner ................. G06F 8/34 379/88.08 |
| 7,965,643 B1 | 6/2011 | Gilbert et al. |
| 8,015,327 B1 | 9/2011 | Zahavi et al. |
| 8,166,458 B2 | 4/2012 | Li et al. |
| 8,291,079 B1 | 10/2012 | Colton et al. |
| 8,306,195 B2 | 11/2012 | Gardner et al. |
| 8,341,462 B2 | 12/2012 | Broda et al. |
| 8,448,148 B1 | 5/2013 | Kolawa et al. |
| 8,464,224 B2 | 6/2013 | Dulip et al. |
| 8,479,122 B2* | 7/2013 | Hotelling et al. ............. 715/863 |
| 8,510,600 B2 | 8/2013 | Gardner et al. |
| 8,583,777 B1 | 11/2013 | Boyle et al. |
| 9,021,362 B2 | 4/2015 | Broda et al. |
| 9,154,611 B1* | 10/2015 | Jackson ............. H04L 41/0253 |
| 9,251,035 B1 | 2/2016 | Vazac et al. |
| 9,450,834 B2 | 9/2016 | Gardner et al. |
| 9,491,248 B2 | 11/2016 | Broda et al. |
| 9,495,473 B2 | 11/2016 | Gardner et al. |
| 9,720,569 B2 | 8/2017 | Gardner et al. |
| 2002/0107826 A1 | 8/2002 | Ramachandran et al. |
| 2002/0138226 A1 | 9/2002 | Doane |
| 2002/0147937 A1 | 10/2002 | Wolf |
| 2003/0074161 A1* | 4/2003 | Smocha ............. G06F 11/3409 702/186 |
| 2003/0074606 A1 | 4/2003 | Boker |
| 2003/0109951 A1 | 6/2003 | Hsiung et al. |
| 2003/0130982 A1 | 7/2003 | Kasriel et al. |
| 2003/0195960 A1 | 10/2003 | Merriam |
| 2004/0010584 A1 | 1/2004 | Peterson et al. |
| 2004/0039550 A1 | 2/2004 | Myers |
| 2004/0059544 A1 | 3/2004 | Smocha et al. |
| 2004/0064293 A1 | 4/2004 | Hamilton et al. |
| 2004/0119713 A1 | 6/2004 | Meyringer |
| 2004/0123320 A1* | 6/2004 | Daily ................. H04N 5/44543 725/61 |
| 2004/0205724 A1 | 10/2004 | Mayberry |
| 2005/0027858 A1 | 2/2005 | Sloth et al. |
| 2005/0102318 A1 | 5/2005 | Odhner et al. |
| 2005/0182589 A1 | 8/2005 | Smocha et al. |
| 2005/0216234 A1 | 9/2005 | Glas et al. |
| 2005/0278458 A1 | 12/2005 | Berger et al. |
| 2006/0031209 A1 | 2/2006 | Ahlberg et al. |
| 2006/0075094 A1 | 4/2006 | Wen et al. |
| 2006/0229931 A1* | 10/2006 | Fligler et al. .................. 705/10 |
| 2006/0271700 A1 | 11/2006 | Kawai et al. |
| 2007/0143306 A1 | 6/2007 | Yang |
| 2007/0232237 A1 | 10/2007 | Croak et al. |
| 2007/0282567 A1 | 12/2007 | Dawson et al. |
| 2007/0283282 A1* | 12/2007 | Bonfiglio et al. ............ 715/762 |
| 2007/0288205 A1 | 12/2007 | Vazquez et al. |
| 2008/0049641 A1 | 2/2008 | Edwards et al. |
| 2008/0059947 A1 | 3/2008 | Anand et al. |
| 2008/0066009 A1 | 3/2008 | Gardner et al. |
| 2008/0140347 A1 | 6/2008 | Ramsey et al. |
| 2008/0147462 A1 | 6/2008 | Muller |
| 2008/0189408 A1 | 8/2008 | Cancel et al. |
| 2008/0235075 A1 | 9/2008 | Couture et al. |
| 2009/0077107 A1 | 3/2009 | Scumniotales et al. |
| 2009/0210890 A1 | 8/2009 | Tully |
| 2009/0271152 A1 | 10/2009 | Barrett |
| 2009/0300423 A1* | 12/2009 | Ferris ................. 714/38 |
| 2010/0023867 A1 | 1/2010 | Coldiron et al. |
| 2010/0057935 A1 | 3/2010 | Kawai et al. |
| 2010/0115496 A1 | 5/2010 | Amichai |
| 2010/0198960 A1* | 8/2010 | Kirschnick et al. .......... 709/224 |
| 2010/0250732 A1 | 9/2010 | Bucknell |
| 2010/0251128 A1 | 9/2010 | Cordasco |
| 2010/0332401 A1 | 12/2010 | Prahlad et al. |
| 2010/0333072 A1 | 12/2010 | Dulip et al. |
| 2011/0066591 A1 | 3/2011 | Moyne et al. |
| 2011/0066892 A1 | 3/2011 | Gardner et al. |
| 2011/0119370 A1 | 5/2011 | Huang et al. |
| 2011/0130205 A1 | 6/2011 | Cho et al. |
| 2011/0191465 A1 | 8/2011 | Hofstaedter et al. |
| 2011/0202517 A1 | 8/2011 | Reddy et al. |
| 2011/0282642 A1 | 11/2011 | Kruger et al. |
| 2011/0096108 A1 | 12/2011 | Agrawal et al. |
| 2012/0017165 A1 | 1/2012 | Gardner et al. |
| 2012/0017210 A1 | 1/2012 | Huggins et al. |
| 2012/0023429 A1 | 1/2012 | Medhi |
| 2012/0101799 A1 | 4/2012 | Fernandes |
| 2012/0166634 A1 | 6/2012 | Baumback et al. |
| 2012/0246310 A1 | 9/2012 | Broda et al. |
| 2012/0314616 A1 | 12/2012 | Hong et al. |
| 2012/0324101 A1 | 12/2012 | Pecjack et al. |
| 2013/0031449 A1 | 1/2013 | Griffiths et al. |
| 2013/0097307 A1 | 4/2013 | Vazac et al. |
| 2013/0116976 A1 | 5/2013 | Kanemasa et al. |
| 2013/0166634 A1 | 6/2013 | Holland |
| 2014/0033055 A1 | 1/2014 | Gardner et al. |
| 2014/0189320 A1 | 7/2014 | Kuo |
| 2014/0280880 A1 | 9/2014 | Tellis et al. |
| 2015/0067527 A1 | 3/2015 | Gardner et al. |
| 2015/0095471 A1 | 4/2015 | Singh et al. |

OTHER PUBLICATIONS

Malan et al. "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

Dillenseger, "CLIF, a framework based on Fractal for flexible, distributed load testing" Nov. 18, 2008, Ann. Telecommun., 64:101-120.

* cited by examiner

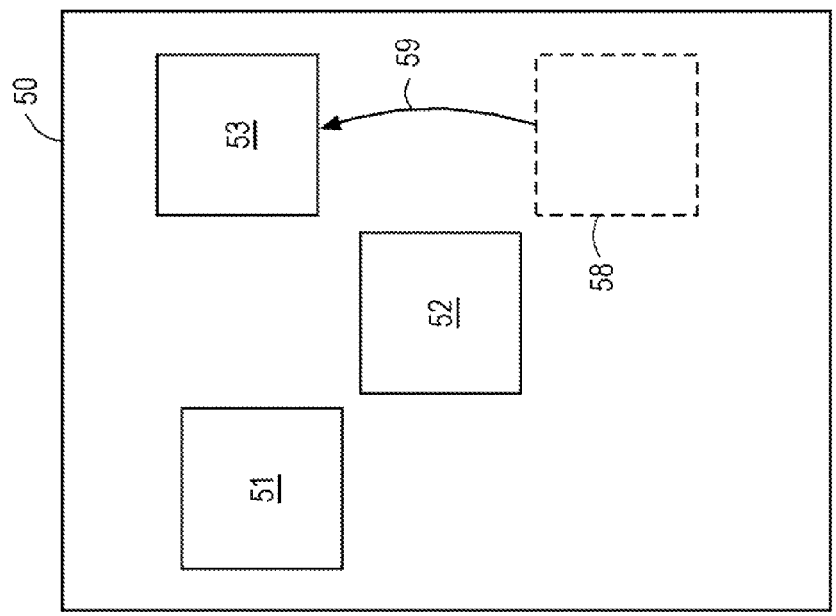
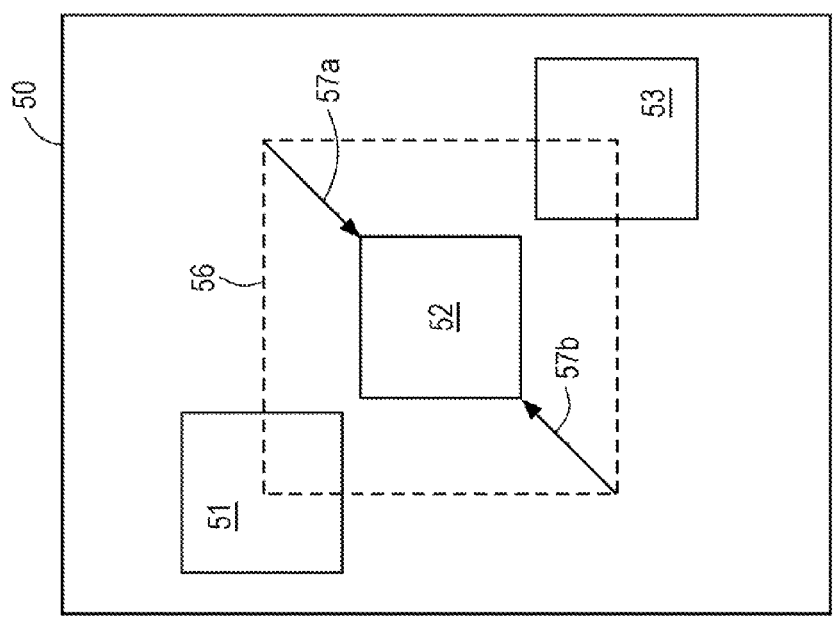

PRIVATE DEVICE CLOUD FOR GLOBAL TESTING OF MOBILE APPLICATIONS

RELATED APPLICATIONS

This application is a continuation-in-part (CIP) application of Ser. No. 12/927,426 filed Nov. 15, 2010, which application is incorporated by reference herein in its entirety, and which application is a continuation of Ser. No. 11/503,580 filed Aug. 14, 2006, now U.S. Pat. No. 7,844,036. Both of the aforementioned applications are assigned to the assignee of the present CIP application. This application is also related to Ser. No. 13/435,925 filed Mar. 30, 2012, entitled "Functional Test Automation For Gesture-Based Mobile Applications".

TECHNICAL FIELD

The present disclosure relates generally to cloud computing; more particularly, to automated systems and methods for functional testing of mobile applications that employ a touch-sensitive, gesture-based user interface.

BACKGROUND

In recent years there has been a huge proliferation of the number of applications (also referred to as "apps") developed for devices such as smartphones, tablets and other mobile computing devices. For example, there are literally hundreds of thousands of mobile applications available in the marketplace for use on hundreds of millions of iOS (iPad, iPhone, etc.) and Android mobile platform devices. On a typical day it is estimated that upwards of 1,000 new apps are created for mobile computing devices. Testing of these mobile applications across different platforms, hardware modules, and software/firmware versions is a huge challenge. By way of example, for a developer to test all the permutations of a mobile application on all the possible variations of hardware (e.g., phone or tablet) modules, for all operating system (OS) versions, and across all vendor firmware versions, such a task could easily result in a thousand or more test case combinations. Thus, the explosion of mobile computing devices and apps for use on these devices is creating a strain on testing organizations.

Adding to the difficulty of functional testing of mobile applications is the evolving voice, touch, movement and gesture-based (e.g., swipe, pinch, zoom, flip, etc.) user interfaces that today's mobile applications rely upon. A plethora of challenges exist, such as how to precisely test different gestures, geolocation, motion, etc., as well as how to realistically conduct load, functional and performance tests on a variety of different mobile devices. For mobile developers, reconciling touch and gesture-based input with design and functionality goals in mobile applications has become a daunting problem. Testing gestures in a mobile application is extremely time consuming and difficult. Companies typically employ a team of engineers to manually test all of the features and functionality of the application on a given platform. Due in part to the slow, arduous, labor-intensive, and error-prone process required for manual functional testing of mobile applications, more than half of all mobile and Web apps are publically released without ever being functionally or scale tested.

Past attempts at functional test automation of mobile applications have typically relied upon the practice of "jailbreaking" the mobile device. Jailbreaking is the unauthorized process of breaking through the locked environment and removing the limitations imposed by manufacturers such as Apple® on devices (i.e., iPhone, iPod touch, iPad) which run the iOS operating system through use of custom kernels. Jailbreaking allows users to gain root access to the operating system, allowing iOS users to download additional applications, extensions, and themes that are unavailable through the official Apple App Store. Jailbreaking is necessary if the user intends to run software not authorized by Apple. Additionally, many prior art testing techniques require that the mobile device be tethered. Tethering refers to the practice wherein the jail broken mobile device is connected via a wire or cable to a hardware component (i.e., a computer) capable of utilizing optical recognition algorithms to read pixels and thus identify the objects (e.g., icons, text, buttons, elements, etc.) displayed on the screen. Optical recognition techniques for functional testing of mobile applications, however, are known to be fragile and brittle. For instance, optical recognition techniques are prone to producing false negative test results following minor software revisions, such as from a change in the position or location of button on the screen.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIGS. 5A-5F illustrate an example sequence of screenshots showing manipulation of objects via gesture-based user input during a capture phase of functional test automation for a mobile application.

DETAILED DESCRIPTION

Figure 1:
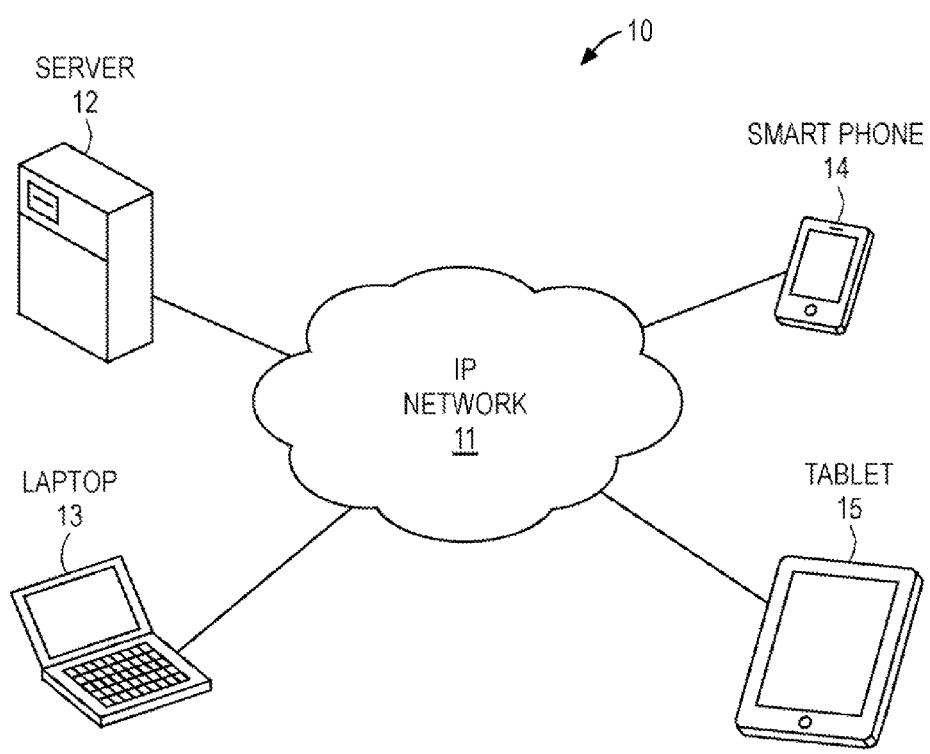
FIG. 1 is an example high level architectural diagram of a cloud computing platform providing functional test automation for mobile applications.

In the following description specific details are set forth, such as mobile device types, operating systems, gesture commands, functions, etc., in order to provide a thorough understanding of the subject matter disclosed herein. However, persons having ordinary skill in the relevant arts will appreciate that these specific details may not be needed to practice the present invention. It should also be understood that the elements in the FIGS. are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure. Cloud computing is closely related to grid computing, which refers to the concept of interconnecting networked computers such that processing power, memory and data storage are all community resources that authorized users can utilize for specific tasks.

A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

A "private cloud" is a cloud that is not generally available to the public, and which is typically located behind a firewall of a business. Thus, a private cloud is infrastructure operated solely for a single organization or business. A private cloud may be hosted and/or managed internally by the business, or externally by a third-party. In the present disclosure, a "private device cloud" refers to a private cloud or network associated with a single organization or business built with devices inside their own data centers or remote office locations. Alternatively, the devices may be provided externally by a third-party host. A private device cloud may thus comprise a large number of devices, including mobile computing devices, located throughout the world.

The term "server" broadly refers to any combination of hardware or software embodied in a computer (i.e., a machine instance) designed to provide services to client devices or processes. A server therefore can refer to a computer that runs a server operating system from computer-executable code stored in a memory, and which is provided to the user as a virtualized or non-virtualized machine; it can also refer to any software or dedicated hardware capable of providing computing services.

A "message" generally refers to a unit of data that can be sent via an electronics communications network, e.g., the Internet, to another computational or communications system or device, e.g., to a server. By way of example, a message could represent a communication sent to a queuing system, a REST call, or a Hypertext Transfer Protocol (HTTP) request. A message could also be instantiated entirely or partially as a single operation, such as a web service call in any one of a variety of forms, e.g., XML, JMS, HTML, JSON, etc. A "message clip" (or "clip" for short) comprises a set of one or more messages that includes a specification of the location, timing and/or dependencies of objects or elements specified within that set of messages. A clip typically comprises a plurality (e.g., hundreds or thousands) of sequenced messages that form part of a larger load test composition.

In the context of the present disclosure, a "mobile computing device" or "mobile device" (for short) refers to any one of a number of different portable electronic devices having a touch-sensitive display with a graphical user interface (GUI), one or more processors, memory and one or more modules, programs or sets of instructions for performing methods associated with the operations described herein. A mobile computing device typically runs on an operating system executed on one or more processors, and may also run one or more applications installed or resident in memory (e.g., firmware, RAM, EEPROM, etc.) In some embodiments, the mobile computing device may provide a plurality of functions including wireless communication, thereby allowing a user of the mobile device access data and information via connection to the Internet. Mobile computing devices include smartphones, tablet computers, wearable computers, ultra-mobile PCs, personal digital assistants, other hand-held devices, as well as other mobile computers (e.g., carputers) that have touch screen interfaces with wireless capabilities.

A mobile application, also known as mobile app, is a term used to describe a software or firmware program that runs on a mobile computing device.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly instantaneously, i.e., within seconds or milliseconds.

In one embodiment, a cloud-based testing platform is provided that delivers complete functional test automation for gesture-based mobile applications. The cloud-based testing platform includes an executable program or computer program product that provides precision capture and playback of all continuous touch gestures including pan, pinch, zoom, and scroll on iPhones, iPads, iPods and Android mobile devices. Touch-based GUI testing is conducted from inside the mobile app, thereby enabling validations based on variable values and internal mobile application state changes. In one embodiment, mobile computing devices are controlled remotely via IP addressing over a wireless network during capture and playback of gesture-based command inputs comprising the functional test of the mobile app. Persons of skill in the art will appreciate that this approach obviates the need for tethering, rooting, or jailbreaking the mobile device.

In another embodiment, a private device cloud is implemented to provide a business enterprise or organization with an efficient, low-cost way of using the mobile devices that the enterprise or organization already owns to test end-user experience from real mobile devices remotely located around the world. Implementation of a private device cloud means that the number of mobile devices needed to perform large-scale testing is greatly reduced. The private device cloud is implemented in one embodiment as a system which comprises a plurality of mobile computing devices associated with an enterprise. The mobile computing devices each have a touch-sensitive display screen operable to receive gesture-based user input during running of a mobile application. The mobile computing devices are geographically distributed across a plurality of different states or countries. The mobile computing devices connect with one or more servers over HTTP or Hypertext Transfer Protocol Secure (HTTPS). The one or more servers run a program for playback of a test composition comprising a timed sequence of clips on the mobile computing devices running the mobile application. The timed sequence of clips includes one or more actions, each of which instructs a precise gesture-based action applied to at least one object displayed on the touch-sensitive display screen. The precise gesture-based action corresponds to a functional aspect of the mobile application and comprising a plurality of data elements previously captured from inside the mobile application while the mobile application was subject to the gesture-based user input entered via the touch-sensitive display screen.

In still another embodiment, the cloud-based platform enables precision functional test automation for mobile applications and mobile devices having next-generation (or mixed-generation) user interfaces, including continuous, multi-touch gestures, voice, kinetics, bendable device, hovering, 3D movement, and 3D navigation/animation browser user interfaces. In a specific embodiment, a functional testing program captures the start and end points of each gesture command input via a touch-sensitive display of a mobile device. In addition, the exact journey of the gesture between the start and end points, including the precise coordinates of the path taken by the user's finger(s), and the temporal variations in the speed with which a particular gesture is performed. In contrast to brittle optical recognition approaches, the method, system and computer program product of the disclosed invention uniquely captures each GUI gesture from within the mobile app (i.e., via code), thereby enabling validations based on variable values and internal mobile app state changes.

FIG. 1 is an example high level architectural diagram of a system 10 for functional test automation of mobile applications in accordance with one embodiment of the present invention. In the embodiment shown, system 10 includes a server 12 connected via a cloud 11 with a laptop computer 13, a smartphone 14 and a tablet 15. Cloud 11 may comprise an Internet Protocol (IP) network, such as the general public Internet, or an intranet private computer network confined to an organization that uses IP technology or a combination of private and public networks. Although FIG. 1 show only one smartphone 14 and tablet 15 each, other embodiments may utilize a plurality of mobile computing devices (e.g., smartphones and/or tablets) for functional testing of a mobile app. In still other embodiments, only a single mobile computing device may be connected with servers 12 and laptop 13 during functional testing of a mobile app installed on the mobile device. Similarly, server 12 shown in FIG. 1 may comprise a single server (as shown) or a plurality of servers, either located at a single center or distributed across different geographical locations.

In the embodiment shown, the cloud-based testing platform, which comprises executable program for capture and playback of a sequence of gesture-based inputs used to functionally test a mobile application on a particular mobile computing device, is deployed on server 12. Server 12 communicates with laptop 13 via a browser application running on laptop 12. In one implementation, the functional testing program running on server 12 operates to create a graphical user interface (GUI) that allows a user of laptop 13 to remotely interact with the testing program. In this way, a user of laptop computer 13 may orchestrate the capture and playback of gesture-based commands as part of a functional test of a target mobile app running on a specific mobile computing device. (The term "target" as used herein refers to a mobile application in combination with a mobile computing device.) Via laptop 13 a user may also compose a test composition comprising a collection of recorded clips obtained from the capture of one or more inputs obtained from one or more mobile devices. In other words, gesture-based inputs or commands may be captured from different devices, or from the same device taken at different times and under different conditions and collected in a database or library associated with server 12. These captured inputs, stored in the form of message clips, may be arranged in a temporally-sequenced composition for playback on a mobile device in an automated manner as part of functional testing of the mobile device.

It is appreciated that in other implementations, laptop computer 13 may comprise a desktop computer, workstation, or other computing device that provides a graphical user interface that allows a user to capture and playback of a sequence of gesture-based inputs used to functionally test a mobile application on a mobile computing device, remotely execute a composition of previously recorded clips on the mobile device from anywhere around the world, as well as analyze/review results of the test in real-time. The GUI may be web-based so it can be accessed from any computer having web-browser capabilities from any location in the world, without installation of specialized software.

Persons of skill in the art will understand that the software which implements the cloud-based functional testing platform may also be downloaded to the user's laptop computer 13 or implemented on a separate hardware appliance unit located either at the user's premises (e.g., behind the firewall) or anywhere in cloud 11. It is further appreciated that laptop 13 is representative of a wide variety of computer devices, such as workstations, personal computers, distributed computer systems, etc., that may be utilized by the user to execute the methods, processes, and testing steps described herein.

Figure 2:
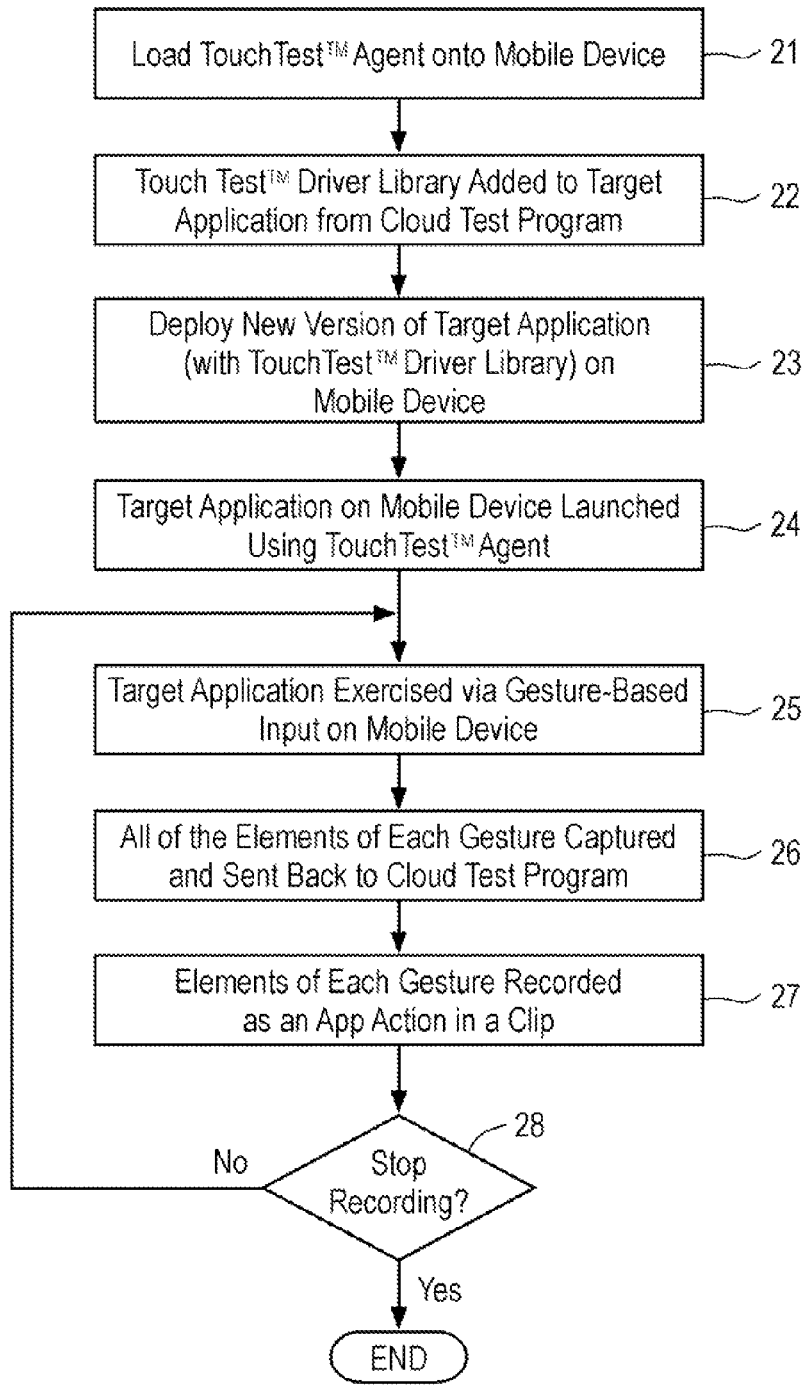
FIG. 2 is an example flow diagram of a sequence of steps for precision capture of gesture-based user input on a mobile computing device.

FIG. 2 is an example flow diagram of a sequence of steps for precision capture and recording of continuous touch, gesture-based user input (as well as text or other types of input) to a mobile app running on a mobile computing device. Once a user logs into the testing program running on server 12 (e.g., via laptop computer 13), he or she may generate a new test clip by capturing gesture-based input (e.g., tap, swipe, pinch, zoom, rotate, etc.) for a mobile app that is running on a remote mobile device. The initial step in the process is the loading of a TouchTest™ device agent (or TouchTest agent for short) onto the mobile device to be tested (block 21). The TouchTest agent is a URL that the user navigates to (e.g., in mobile Safari, or any other mobile web browser) which enables the remote launching of the particular mobile application that the user wishes to test on that mobile device. The TouchTest agent may be customized for the specific hardware/software/firmware platform on which it is intended to run. In one embodiment, the Touchiest agent is a web application that the user may browse to via laptop 13.

It should be understood that the Touchiest agent itself is not the mobile application to be tested; rather, it is a web application program that is used to launch the particular mobile application to be tested. The TouchTest agent thus provides a wireless connection to an automated test integration system, wherein functional testing can be performed continuously over an extended time period without anybody actually physically being there to launch and terminate the mobile app. Note that a user need only enter the information required for login once (as shown in field 42 of FIG. 4), i.e., when the TouchTest agent is first launched.

Continuing with the example of FIG. 2, the next step in the process is the addition of a Touchiest Driver component library to the target mobile application (block 22). In one embodiment the library is dropped inside the application via a script that the user runs. Note that the script may typically create another deployment target in the mobile app project utilized specifically for functional test purposes (e.g., not the actual mobile application sold via an app store). That is, in the embodiment shown, the next step is the deployment of a new version of the target mobile app (with the TouchTest Driver library) on the mobile device (block 23). In another embodiment, the mobile application developer may compile the library into the application to enable functional testing. The TouchTest Driver component library enables, from within the application code itself, the observation and tracking of every element that is displayed on the screen of the mobile device.

Persons of skill in the art will understand that the approach described herein does not involve the use of optical recognition algorithms. That is, because the TouchTest Driver component library is inside the application it is possible to introspect the object model of the mobile application and then identify via code every element that appears on the screen. This information may then be transmitted (wirelessly) to the remote server running the cloud-based functional testing program. For instance, when a click on the button or icon occurs, that object may be identified wherever it is located on the screen page and observed changing (state, position, etc.). The TouchTest Driver component library thus provides the ability to record with very high precision what happens to objects on the screen as a result of gesture-based user input during interaction with the mobile application. For example, when a user makes a change to an object on the touch-screen via a multi-touch input (e.g., zoom command) the functional test program records the exact gesture and changes that happen to that object with the same precision as takes places via the user input. Later, the recorded gesture may be played back remotely by the program such that the object reacts as if the operating system running on the mobile device invoked it via direct manual user interaction with the touch-screen.

This approach of recording gesture-based inputs by natively using the mobile application allows for manual testing of the target while precisely recording all functional test gestures input to a mobile computing device. The user interface of the functional testing program also allows a user to create a test composition using recorded clips, as well as playback of the composition on the remotely located mobile device using advanced test automation features. For instance, the user may add delays into the automated test, or perform conditional testing wherein the test waits for or responds to certain changes to objects on the screen. In other words, the user can validate that a particular object has a particular state—whether the state of a button, icon, image, etc.—with extremely high accuracy and without the errors common to past approaches that rely upon optical recognition techniques. Very complex test cases may therefore be created for automated testing of remote targets.

Once the testing component, TouchTest Driver, library has been added to the target mobile application, the target mobile application may be launched remotely via the GUI of a user's laptop or other computer using the TouchTest agent (block 24). With the target running the application, inputs may be made in any manner (gesture event, motion event, click event, typing event, etc.) to exercise any and all features of the application (block 25). Each gesture (or other input) that is invoked directly on an object on the screen is immediately captured with precision and transmitted wirelessly back to the cloud testing platform, e.g., server or other computer running the functional test program (block 26). The elements of each input, which include the position coordinates and temporal speed or velocity (rotational and directional, if applicable) at which gestures or changes are made to each object, are then recorded as an app action in a clip (block 27). App actions are clip elements just like http messages, soap messages, delays, etc. Note that the clip elements which contain the precision elements of a gesture-based input are referred to as app action clip elements. The process of capturing all gesture-based user inputs with precision, sending the captured information back to the server, and recording of the information in a message clip (stored in memory) continues until the user elects to stop the recording (block 28).

Figure 3:
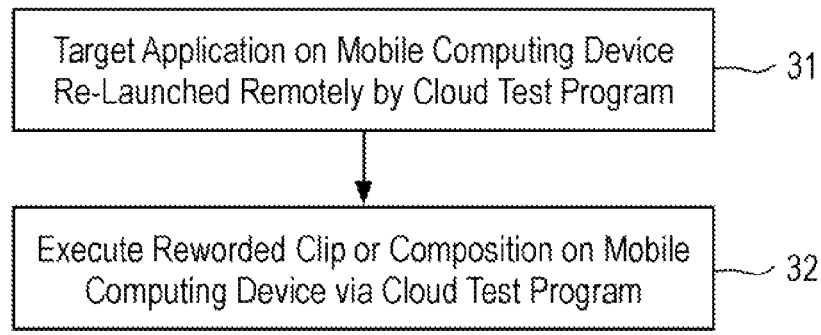
FIG. 3 is an example flow diagram of a sequence of steps for playback of previously-captured gesture-based user input on a mobile computing device.

FIG. 3 is an example flow diagram of a sequence of steps for playback of previously-captured gesture-based user input on a mobile computing device. After recording one or more clips that includes gesture-based or other types of user inputs to a mobile application, a composition editor GUI of the functional test program may be utilized to create a test composition. By way of example, the test composition may comprise a sequence of clips that are laid out on parallel tracks for execution on the target mobile device. To initiate the playback process, the target application on the mobile computing device is re-launched by the remote testing program (or other remote computer) via the device agent (block 31). The recorded clip or test composition may then be executed by the user, e.g., clicking on a "playback" button (block 32). It is appreciated that each test clip plays out on the target mobile device exactly as it was originally recorded (assuming no alterations or changes made via a clip or composition editor). Test performance, including statistics and other test metrics, may be displayed in real-time on an analytic dashboard. It is appreciated that playback of a recorded clip occurs at exactly the same precision (temporal speed, sequence timing, coordinate locations, etc.) at the time the gesture (regardless of the number of finger touches involved or number of objects effected) or other input was captured and recorded.

When a given test is over, another test may be launched via the device agent as part of a continuous test integration framework. In addition, persons of skill in the art will appreciate that the cloud testing platform described herein makes it possible to functionally test multiple devices located at different geographical locations simultaneously. For instance, a test composition may comprise a plurality of tracks, with each track including test clips set to play on a different device. By way of example, certain mobile applications may be developed to run universally on iPad, iPhone and iPod Touch devices. A test composition may be created which includes different tracks, each track including test clips to play on a different device running the same mobile app. The playback may occur simultaneously and wirelessly on each of the devices without jailbreaking, tethering, emulation, simulation, or the need to have the mobile devices geographically co-located.

It should be further understood that playback is not limited to actions of a single object affected by a user's input. Playback of a test composition may include simultaneous actions of a multitude of objects, such as in the case of a multi-player game having different characters and changing backgrounds. In some cases, multiple objects may all be simultaneously affected by inputs not just resulting from a user's finger movements across a touch-sensitive screen, but also from accelerometers, gyroscopes, compass and GPS coordinate inputs. All of this information is precisely captured and available for precision playback as part of functional test automation. Note that this is not limited to what actions are performed on just one object—it also includes actions simultaneously performed on a multitude of objects. For example, the mobile application may comprise a game where there are multi-players, and where each of the different players make gesture-based inputs on a variety of different objects.

After the user of the target has stopped exercising the mobile device, the recorded clip is then saved to a memory (e.g., RAM, EPROM, EEPROM, magnetic disk, etc.) associated with the remote server. Thereafter, a user of the cloud-based testing platform may play the clip back exactly as it was recorded, edit the clip via an editor UI to change elements or otherwise create a new test composition.

Figure 4:
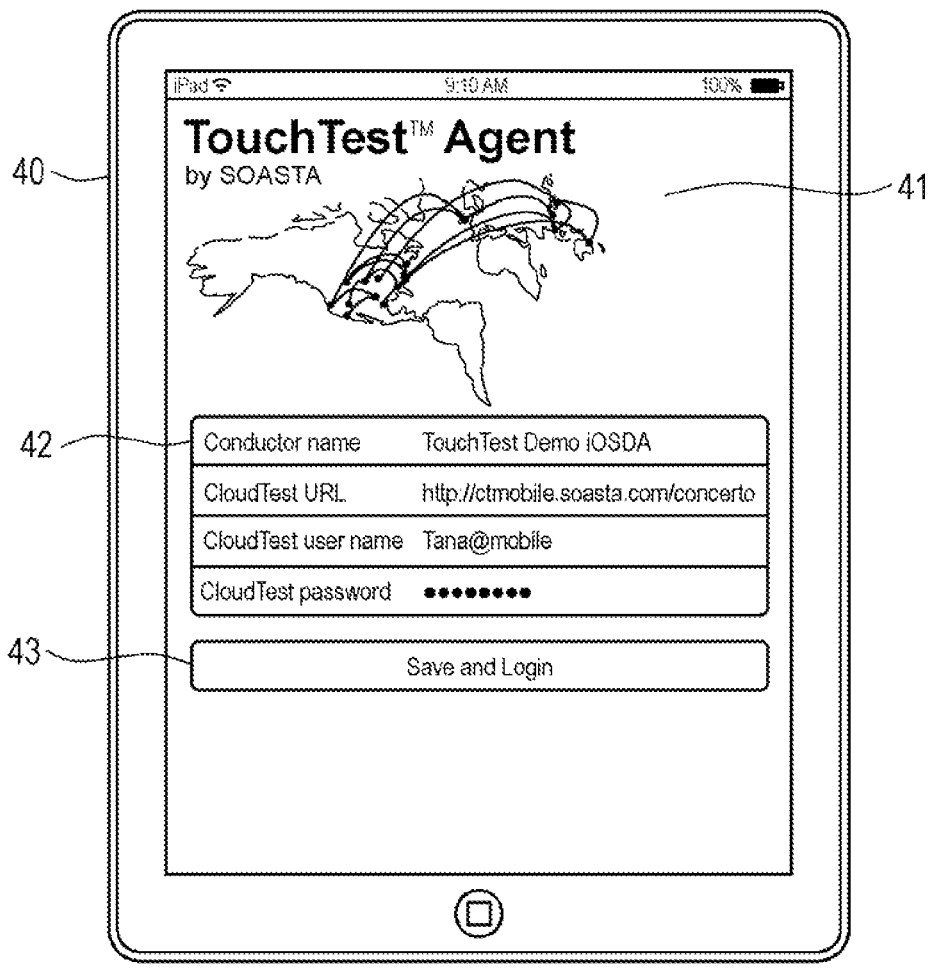
FIG. 4 illustrates an example mobile computing device running an iOS device agent program.

FIG. 4 illustrates an example mobile computing device 40 (e.g., Tana's iPad) running an iOS device agent program (TouchTest Agent), which is shown appearing as screenshot 41 on mobile device 40. As can be seen, screenshot 41 includes a field 42 listing the Device Agent name (i.e., TouchTest Demo iOSDA), the Uniform Resource Locator (URL) address of the server running the cloud-based testing program (i.e., http://ctmobile.soasta.com/concerto), the username (i.e., Tana@mobile), and the user's password (hidden). A Save and Login button 43 is also shown. During the capture and recording phase of functional testing, the mobile application (mobile app) under test may be launched via a message sent to the TouchTest agent from a remote computer (e.g., laptop 13 of FIG. 1).

Figure 5B:
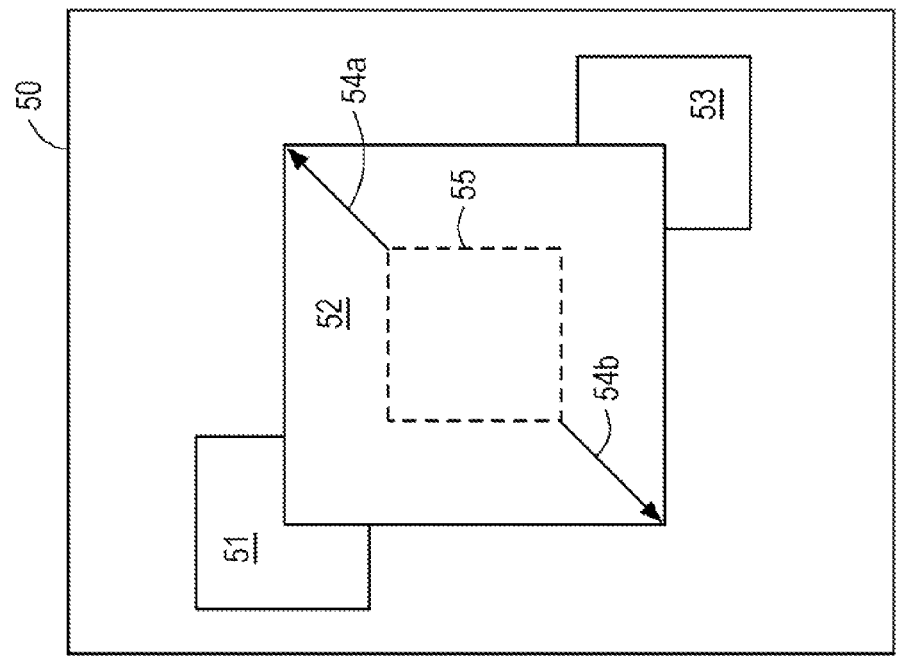
Figure 5A:
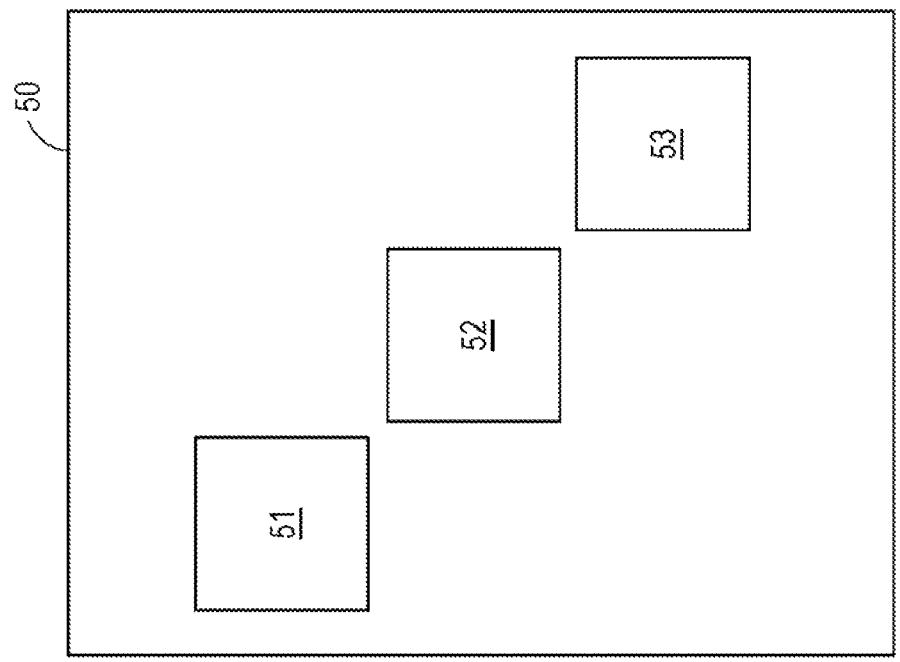

FIGS. 5A-5F illustrate an example sequence of screenshots showing manipulation of objects via gesture-based user input during a capture phase of functional testing a mobile application. FIG. 5A shows a graphical user interface window 50 of a touch-sensitive screen of a mobile device running a mobile application that displays three objects 51, 52 and 53 (i.e., squares) respectively shown from left-to-right and top-to-bottom on the screen. FIG. 5B shows GUI window 50 following a continuous, multi-touch gesture (e.g., zoom) made by a user on object 52. This gesture input is represented by arrows 54a and 54b which show the expansion of the square shape of object 52 from its previous shape/location (shown by dashed lines 55) to its larger square shape that now overlaps adjacent objects 51 and 53. FIG. 5C illustrates GUI window 50 following a squeeze or pinch gesture (represented by arrows 57a & 57b) made on object 52 that reduced the size of object 52 from its immediately preceding shape/location shown by dashed lines 56.

In FIG. 5D the user has selected object 53 via a tap or touch gesture and moved it to a new position in the upper right hand corner of GUI window 50 using a continuous touch sliding gesture shown by arrow 59. Note that when this gesture is performed on the mobile device, the TouchTest Driver captures the exact location coordinates and temporal speed of the gesture as it occurs on the screen. In this case, each of the positional coordinates of the arc shown by arrow 59 is captured and the information is sent back to the functional test program. The velocity of the movement (sampled in small increments of time) is also captured. For example, the user may begin to move object 53 slowly, and then increase the speed of his finger before stopping and releasing his finger from the touch screen. The functional test program not only captures the starting point (represented by dashed line 58) and end point of the gesture, but also the path taken (arrow 59) and the temporal speed that the gesture took place. For instance, the program may capture the gesture input as including an array of velocity vectors (e.g., each vector sampled every 100 milliseconds).

Figure 5F:
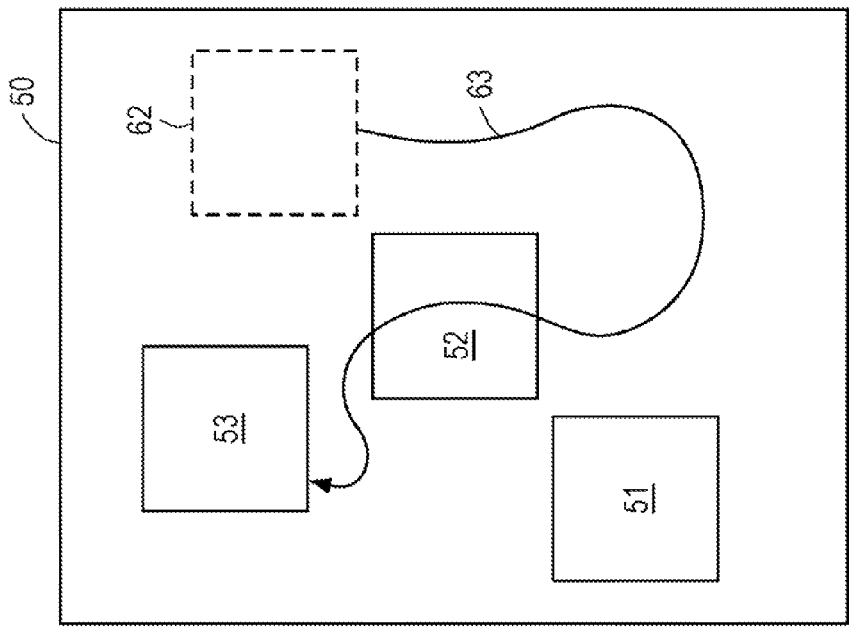
Figure 5E:
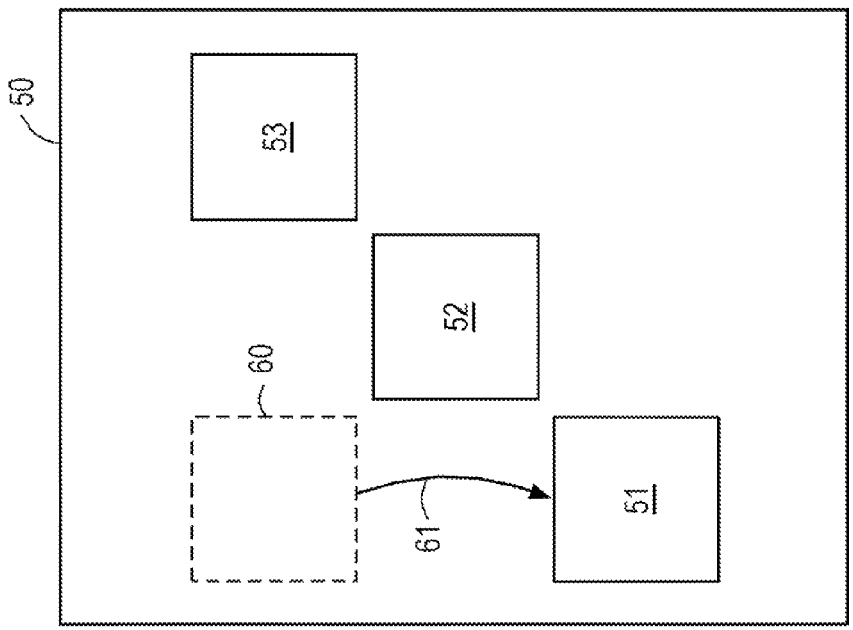

FIG. 5E illustrates the next gesture input or command in the sequence, which consists of the movement of object 51 from its previous position shown by dashed lines 60, to its new location at the bottom, left-hand position of GUI window 50. Arrow 61 shows the path that object 51 took as a result of the continuous touch gesture input of the user.

FIG. 5F shows a final continuous touch gesture input in the test sequence in which object 53 is moved from the location shown by dashed line 62 to a new location in the upper, left-hand corner of GUI window 50. In this case, object 53 travels a circuitous path represented by arrow 63, which reflects the continuous touch gesture input of the user. As discussed above, each coordinate point along the path shown by arrow 63 is captured and recorded by the functional testing program in response to the gesture-based user input. Additionally, the temporal speed along the path is recorded such that playback of the recorded test clip exactly and precisely reproduces the movement of object 53.

Figure 6:
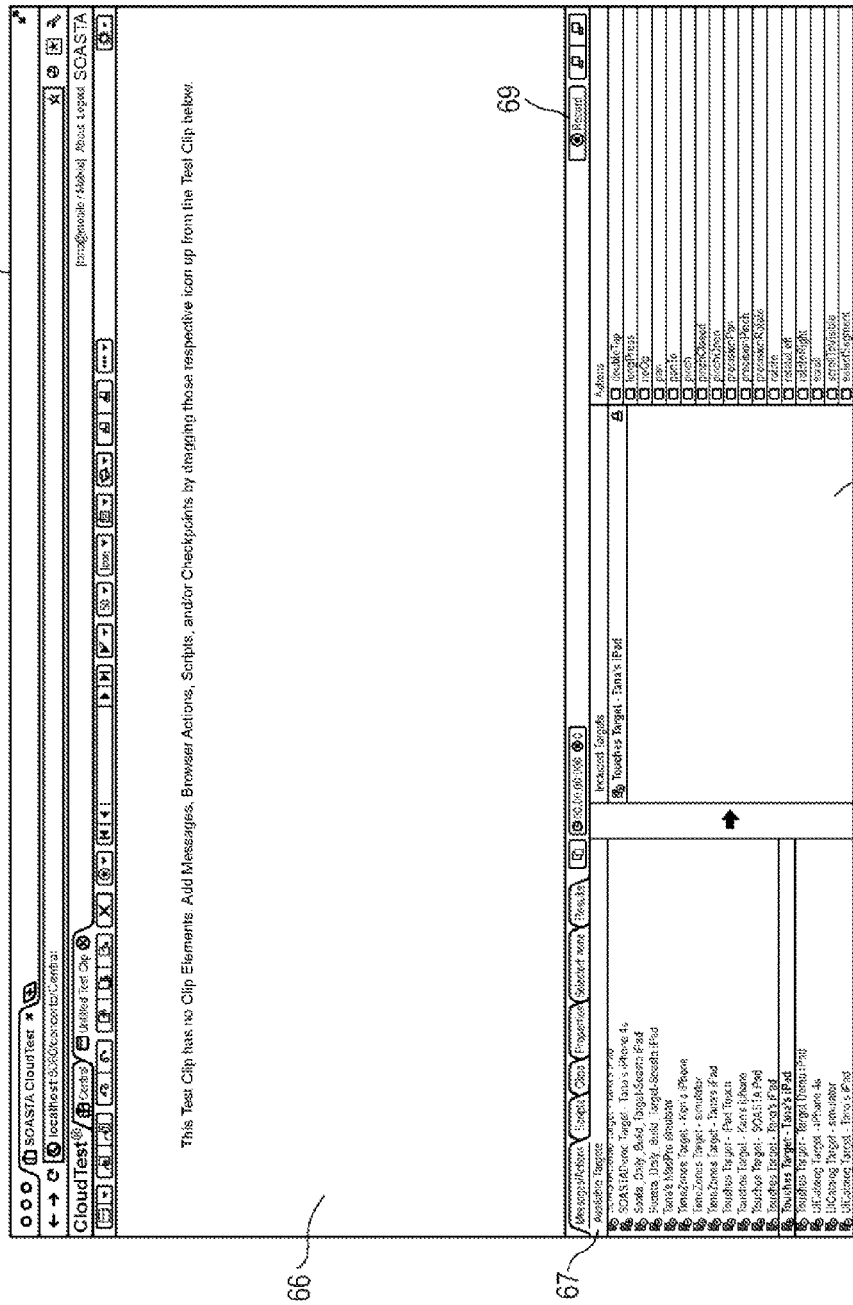
FIG. 6 is an example graphical user interface window that shows selection of a remote mobile computing device targeted for precision capture of gesture-based user input.

FIG. 6 is an example GUI window 65 that may be produced on the display screen of a user's computer (e.g., of laptop 13) immediately after logging into the cloud-based functional testing program. In this example, an untitled test clip tab or field shows an absence of messages or clip elements since recording has yet to begin. The user may initiate capture and recording of inputs made by another user on a selected target by clicking on or selecting "Record" button 69. A listing of available targets (pre-loaded with appropriate device agent software) is provided in tab 67 shown in the lower left-hand corner of window 65.

As shown, the target (mobile app+mobile device) selected by the user in this example is "Touches Target—Tana's iPad". Once selected, the Touches Target—Tana's iPad target appears or is moved into the list of included targets of field 68. It is appreciated that one or more targets may be selected for the test clip to be generated during the capture/recording process. Clicking on button 69 commences recording of all inputs to the "Target Touches" mobile application launched on "Tana's iPad" mobile computing device, wherever that mobile device is located (e.g., anywhere in the world via IP network connections). In other words, a first user working on laptop 13 may utilize GUI window 65 at a first geographic location to remotely select a target (defined as a mobile app and mobile device) at a second geographic location for capture/recording of all inputs made by a second user working on that mobile device.

Figure 7:
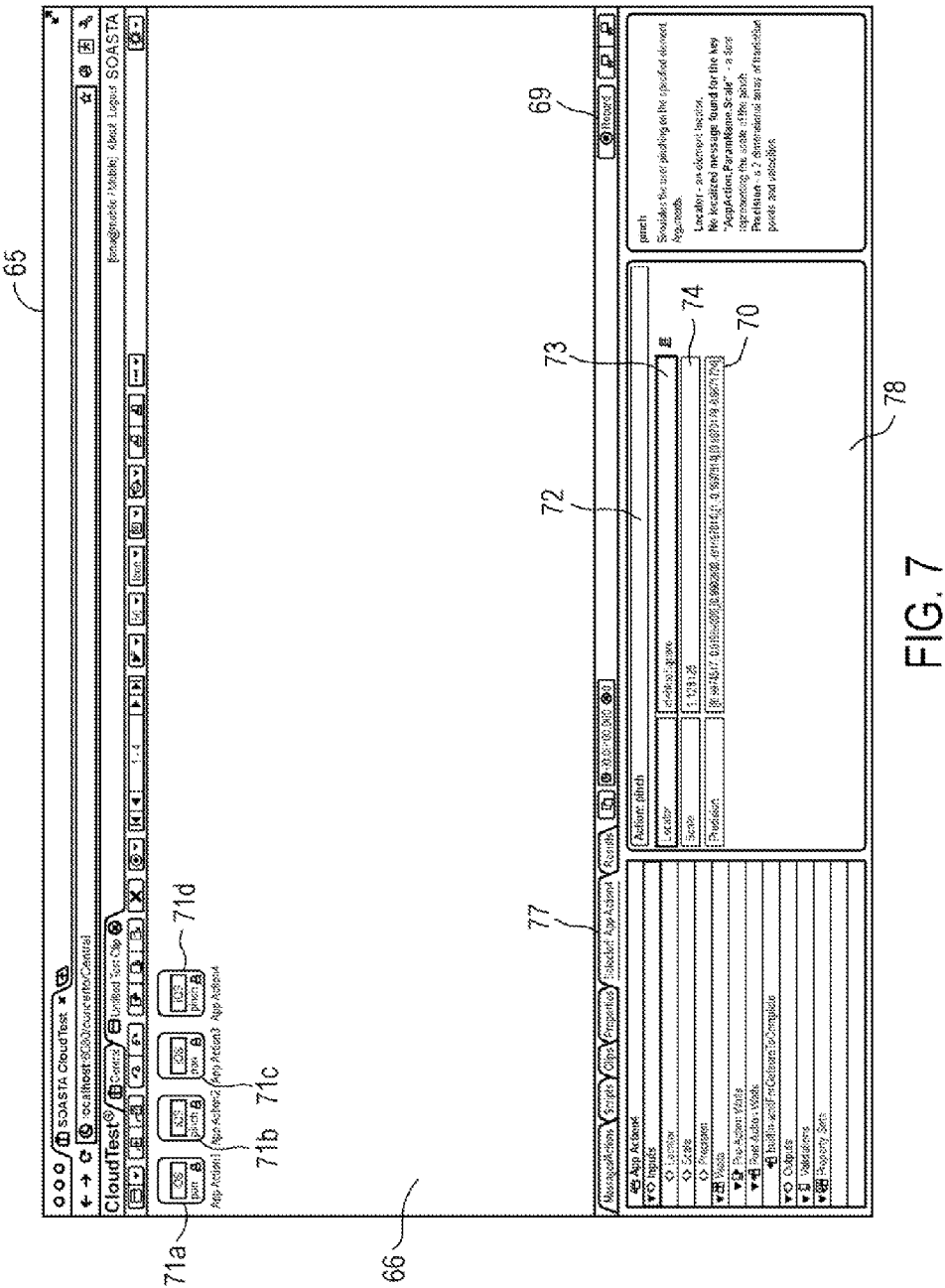
FIG. 7 is an example graphical user interface window that shows a test clip automatically created in response to the precision capture of gesture-based user input on a remote mobile computing device.

FIG. 7 illustrates GUI window 65 with a test clip automatically created in response to the precision capture of gesture-based user input on a remote mobile computing device. In this example, Record button 69 has already been clicked and four gesture-based inputs or actions (depicted as message/action icons 71a-71d) are shown recorded in test clip tab 66. Tab 77 shows App Action4 selected, corresponding to icon 71d in the test clip field 76. Note that tab 77 provides the user with a variety of selectable drop-down menu options, which include Pre-Action Waits, Post-Action Waits, Outputs, and Validations. Field 78 provides detailed information about the selected App Action4. In the embodiment shown, field 78 includes a descriptor field 72 indicating the type of gesture-based action (i.e., pinch) captured/recorded; an object locator field 73 (id=blueSquare); a scale field 74, and a precision data field 70. Field 70 contains an array of all of data (e.g., position coordinates, temporal speed, etc.) captured by the touch test component library from inside the mobile application response to the pinch action of the mobile device user.

Figure 8:
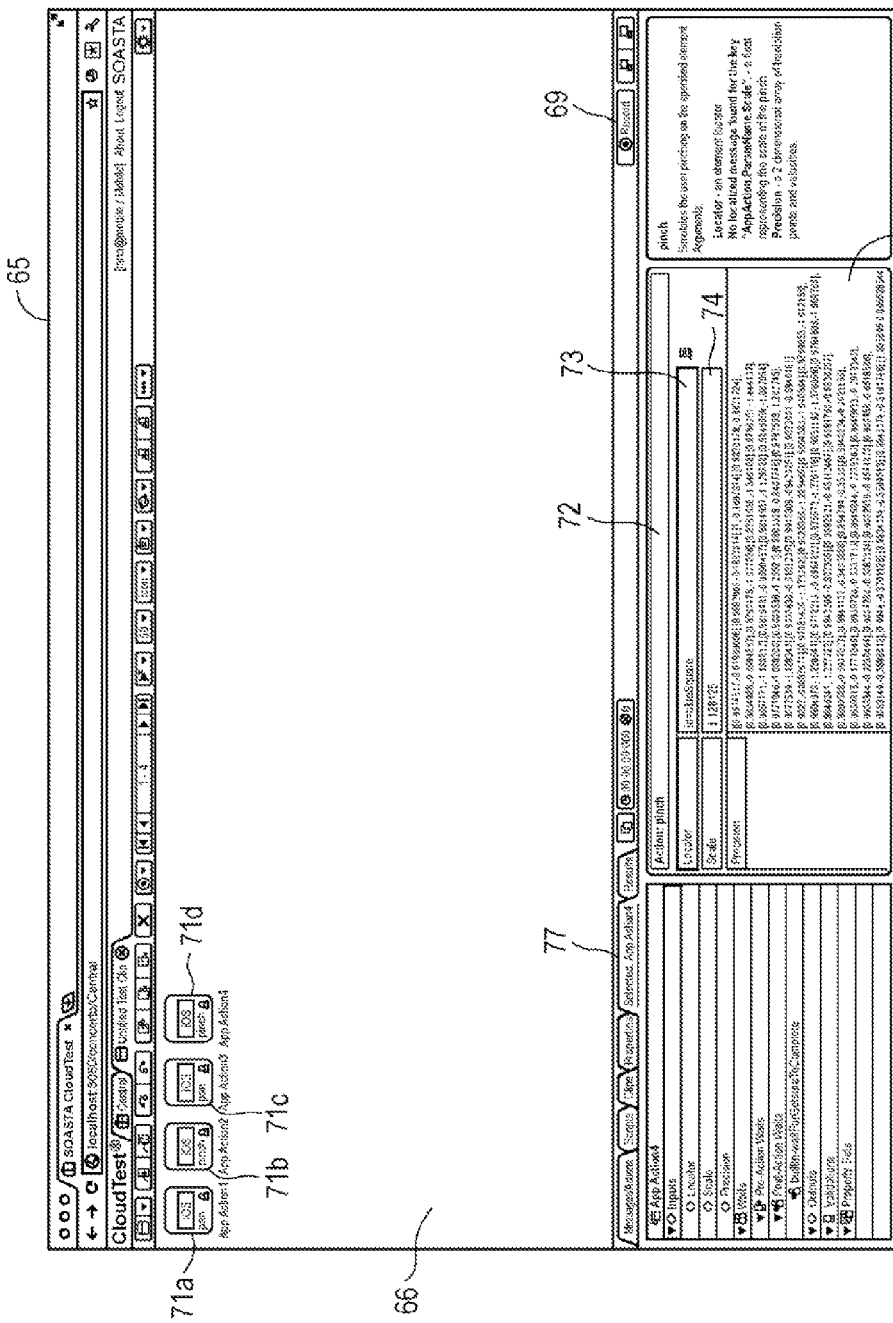
FIG. 8 is an example graphical user interface window that shows an array of data elements produced by the precision capture of a pinch-action gesture on a remote mobile computing device.

FIG. 8 illustrates GUI window 65 with precision data field 70 expanded to show all of the detailed data (e.g., coordinates captured/recorded over time) associated with the pinch gesture that corresponds to icon 71c in the test clip.

Figure 9:
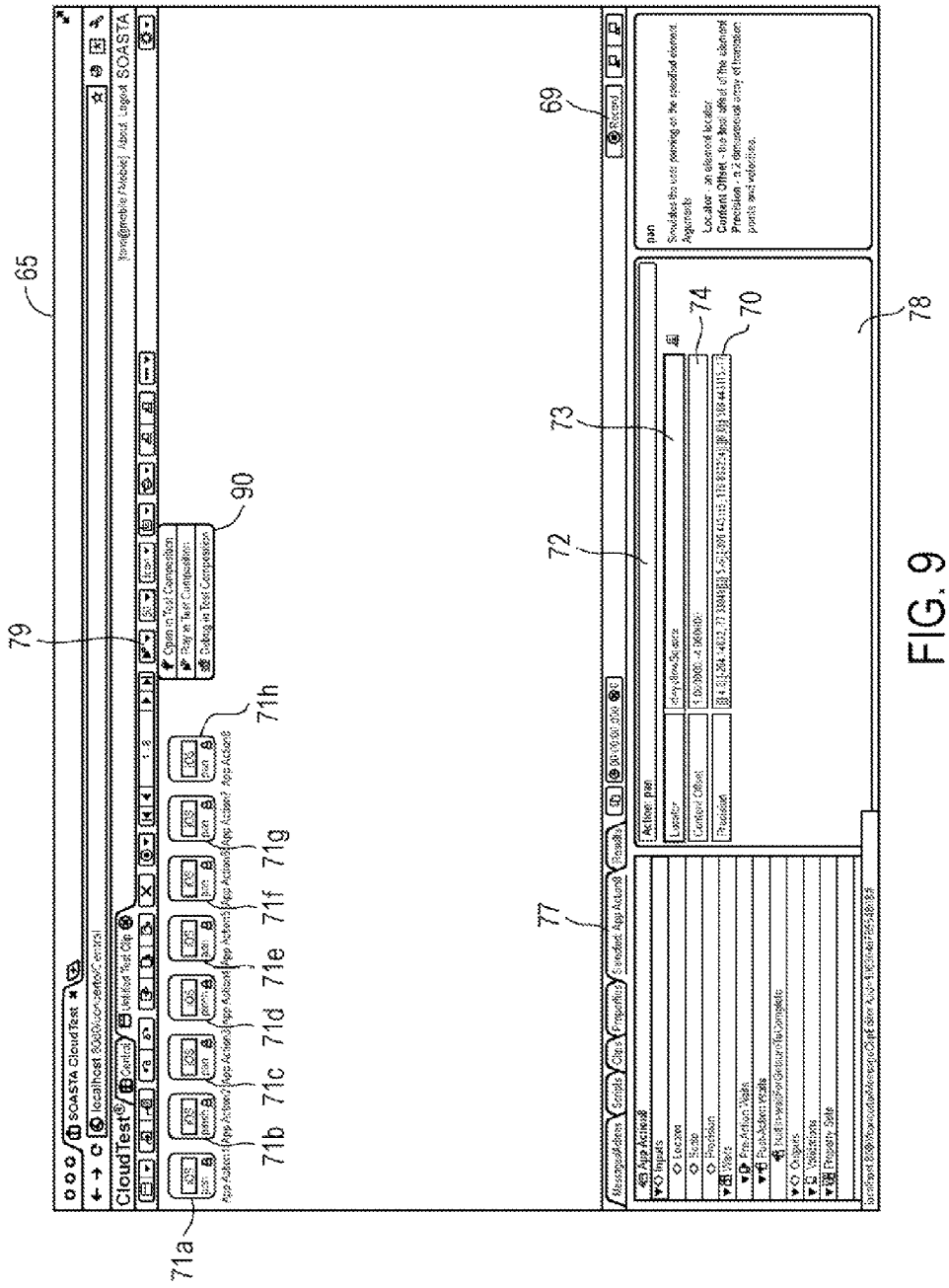
FIG. 9 is an example graphical user interface window that shows selection of a test clip for playback in a test composition.

FIG. 9 illustrates GUI window 65 with precision data field 70 after the capture/recording of additional gesture-based input actions 71e-71h. In this example, tabs 77 and 78 show selected App Action 8 associated with a pan gesture that corresponds to icon 71h in the test clip. Note also that command button 79 is shown clicked, resulting in a pull-down menu 90 of options from that the user may select. As shown, button 79 allows the user to open the recorded clip in a test composition, play the clip in a test composition, or debug the clip in a test composition (e.g., using a clip editor UI). By way of example, using the clip editor, a user may convert the scale of a pinch gesture from the precisely recorded value to a different value that may be more relevant to the test. The same is true with respect to any of the gesture-based inputs or other inputs precisely recorded.

As discussed, playback of a previously recorded test clip results in execution of all of the user input actions, exactly as they were precisely captured on the mobile device. That is, when a user incorporates the clip into a test composition and plays it back, all of the previously-recorded actions will be played back on the target at exactly the same speed and exactly the same positions as when the user was exercising the mobile app during the capture/recording phase. Note that the user of the functional testing program also has the option of adding delays, waits, or otherwise modifying or changing the sequence of actions for playback in the test composition.

Upon completion of all functional testing, the testing component library, TouchTest Driver, may be removed from the target prior to submission of the mobile application to a commercial app store.

Private Device Cloud

In addition to performance and functional testing of mobile applications on various mobile platforms, it is important that the tests accurately reflect the user environment, including web services calls from games or other apps as well as mobile browsers. In one embodiment, this is achieved by testing mobile devices and apps across worldwide geographies through the implementation of a private device cloud. The private device cloud comprises a plurality of mobile devices associated with a business organization or enterprise, which devices are distributed in different countries and/or continents. The cloud-based functional test program described herein may be utilized to playback a test composition on each of these devices (either individually in a serial manner, or simultaneously in parallel). Because each of these devices is located in different parts of the world, the private device cloud may be utilized to ensure that mobile apps perform as intended in different countries, on different device platforms, and over different Internet backbones and communication service providers. That is, the private device cloud may be employed to ensure mobile apps deliver on business promises, with accurate and repeatable tests that incorporate how real users are affected by dynamic mobile network conditions. This ensures that the mobile application performs consistently and reliably across the entire infrastructure (worldwide).

Figure 10:
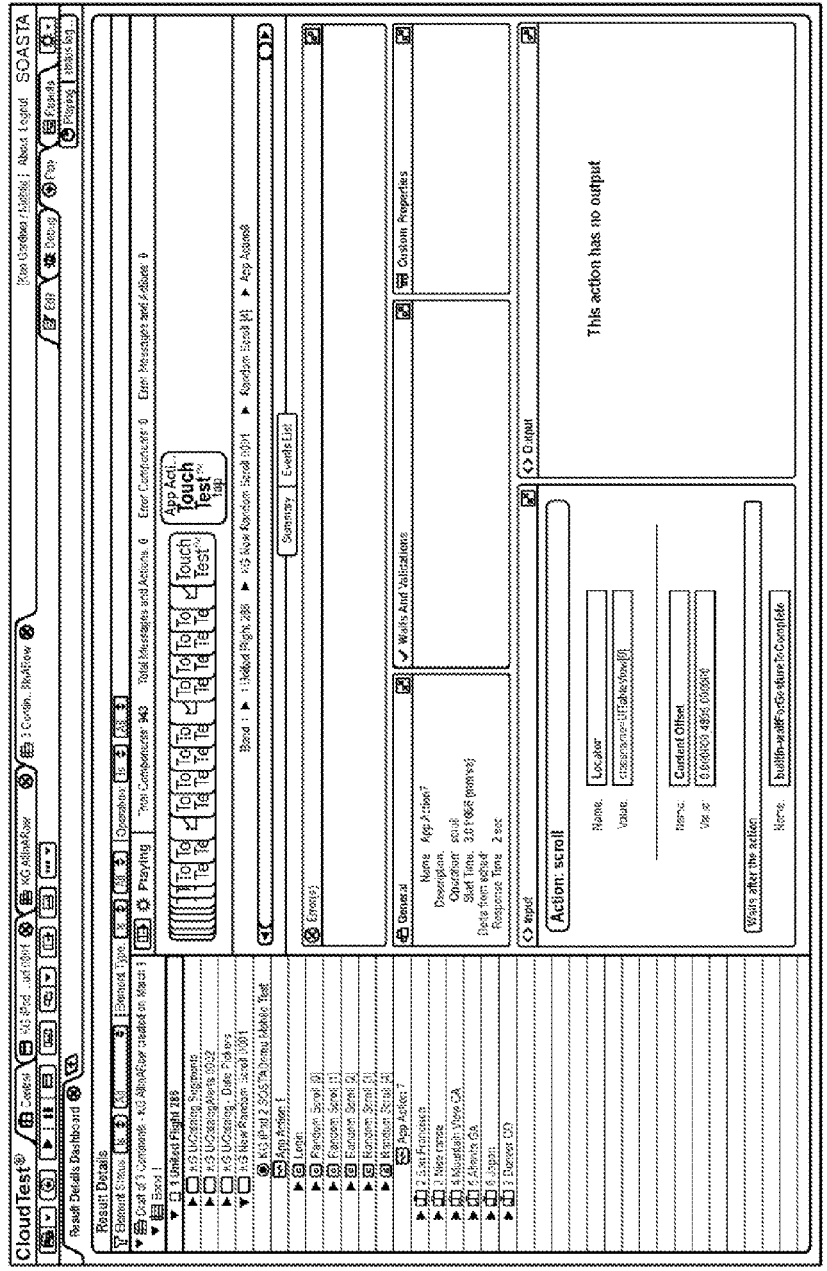
FIG. 10 is an example graphical user interface window that shows playback of a test composition on multiple devices throughout the world via a private device cloud.

By way of example, FIG. 10 is a graphical user interface window 100 that shows an actual demonstration of a test composition being played on multiple devices throughout the world via a private device cloud. As shown, the test composition is being played on seven different mobile devices running the same mobile application, with the seven mobile devices being distributed across three continents. That is, the actual physical mobile devices on which the app actions of the test composition are playing are located in San Francisco, Calif. Nice, France, Mountain View, Calif. Atlanta, Ga. Japan, and Denver, Colo. Note further that this real-world demonstration is itself being orchestrated from a mobile device (KG iPad) that is located in a commercial airplane currently in flight (United Flight 286).

Persons of skill in the art will appreciate that the concept of a private device cloud leverages the cloud computing paradigm, but with real devices. That is, without tethering, the employees of an organization or enterprise company who are located around the world can use their own mobile devices (e.g., iPhone, iPad, Android-based devices, etc.), including employees' existing devices, to create a private test network for testing mobile applications. A private device cloud for functional test automation of mobile applications thus provides a low-cost way of using the devices a business organization already owns to test end-user experience from real devices distributed around the world. Distributed devices communicate with their server via HTTP(S), thereby obviating the need for tethering or jailbreaking, and allowing real mobile devices located anywhere in the world to be used in a functional test of a mobile application.

Test results generated from the playback of the test composition on each of the mobile communication devices may be communicated back to the server or other computing device from each of the mobile computing devices via standard communications protocol such as HTTP or HTTPS. Aggregated and correlated test results may be delivered back to a user or testing team in a single analytics dashboard UI. In other words, the cloud-based functional test program described herein aggregates and/or correlates all mobile applications metrics—end-user experience, network performance, bandwidth, application and system metrics—in a single graphical view provided on a dashboard screen of a user's laptop, mobile computing device, or desktop computer. The view, provided on a GUI, may include the effects of load and network constraints on the actual end-user mobile devices.

In an alternative embodiment, a private device cloud comprising a plurality of mobile devices distributed around the world may be provided to an organization or enterprise by a third party.

Figure 11:
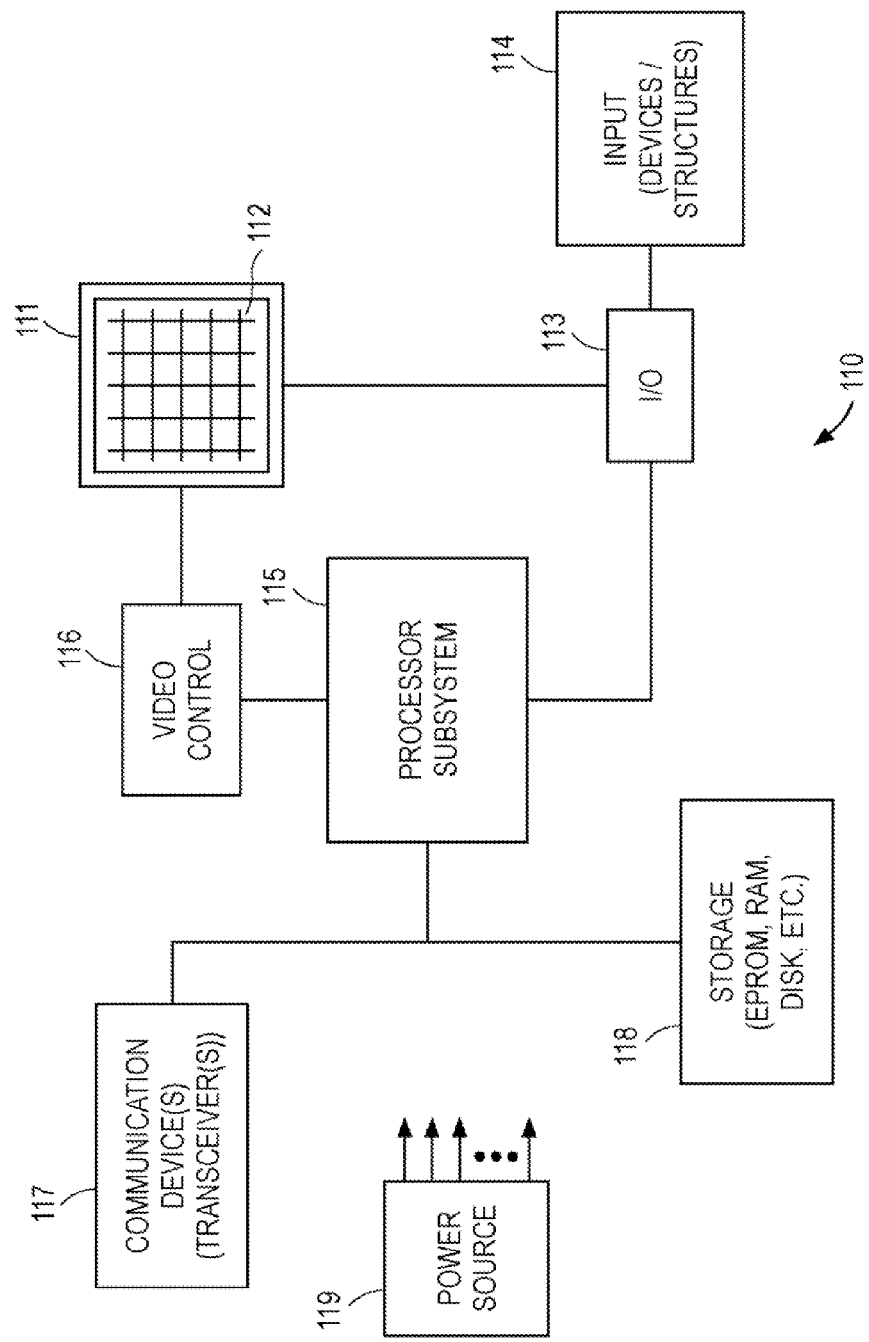
FIG. 11 is a generalized circuit schematic block diagram of an electronic computing device.

FIG. 11 is a generalized circuit schematic block diagram of a mobile computing device 110, which may comprise any of the computers, handheld computing devices, or other types of electronic processing devices, as described herein. Mobile computing device 110 typically comprises a number of basic subsystems, each of which is powered by a power source 119 (e.g., a battery), including a processor subsystem 115, a memory or storage 111 and an input/output (I/O) subsystem 113. Data may be transferred between storage 118 and processor subsystem 115, and between processor subsystem 115 and I/O subsystem 113, over dedicated buses, other bus structures, or via direct connection. An input subsystem 114 comprises various input devices/structures configured to control one or more device functions when pressed or otherwise actuated. The input structures may include a keypad, buttons, switches, etc., for entering input or controlling various modes of operation (e.g., sound, power, communication, or other settings). In certain implementations, input subsystem 114 may be used to navigate through the GUI (provided via display screen 101) that allows a user to interact with computing device 111. A touch-screen interface 112 associated with display screen 111 may also be used to receive user input, such as any of the variety of gesture-based user inputs described previously. A video controller 116 is configured to receive data and commands from processor subsystem 115 for controlling display screen 111. A communication subsystem 117 includes interfaces for one or more devices, such as one or more transceivers, for communicating with short-range (e.g., Bluetooth) and/or long-range communication networks. For example, communication subsystem 117 may include a wireless local area network (WLAN) interface (e.g., an IEEE 802.11x wireless network). As appreciated by persons of skill in the art, device 111 may utilize one or more communication protocols (e.g., HTTP or HTTPS) for data transmissions over a variety of networks.

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific, embodiments, numerous modifications and alterations are well within the scope of the present invention. Accordingly, the specification and drawings are to be regarded in an illustrative rather than a restrictive sense.

We claim:

1. A system for worldwide cloud-based functional testing of mobile applications comprising;
    a plurality of mobile computing devices associated with an enterprise, the mobile computing devices each having a touch-sensitive display screen operable to receive gesture-based user input during running of a mobile application, the mobile computing devices being geographically distributed across a plurality of different countries;
    one or more servers connected with the mobile computing devices over one or more networks, the one or more servers being geographically remote from each of the mobile computing devices;
    a memory associated with the one or more servers that stores precision elements of each of a plurality of previously captured gesture-based user inputs;
    the one or more servers being operable to run a program for playback of a functional test composition comprising a timed sequence of clips on the mobile computing devices running the mobile application, the timed sequence of clips including one or more messages each of which instructs a gesture-based action applied to at least one object displayed on the touch-sensitive display screen, each gesture-based action including the precision elements of a previously captured gesture-based user input stored in the memory, each gesture-based action corresponding to a functional aspect of the mobile application,
    wherein the precision elements include parameters defining changes made to each object affected by the previously captured gesture-based user input, the precision elements having been captured from inside the mobile application while the mobile application was subject to the gesture-based user input entered via the touch-sensitive display screen.

2. The system of claim 1 wherein the different countries extend across different continents.

3. The system of claim 1 wherein the different countries include different Internet backbones.

4. The system method of claim 1 wherein each of the mobile computing devices communicates with the one or more servers via Hypertext Transfer Protocol (HTTP) or Hypertext Transfer Protocol Secure (HTTPS).

5. The system method of claim 1 wherein each of the mobile computing devices connects with the one or more networks via a wireless connection.

6. The system method of claim 1 further comprising aggregating test results produced from the playback of the functional test composition on the mobile application running on the mobile computing devices.

7. The system method of claim 1 wherein the mobile computing devices are owned by the enterprise or employees of the enterprise.

8. The system method of claim 1 wherein the mobile computing devices are owned by a third party.

9. The system of claim 1 wherein the parameters comprise start and end point coordinates of a path, and temporal variations of speed, associated with the previously captured gesture-based user input.

10. The system of claim 1 wherein the playback of the functional test composition occurs simultaneously on each of the mobile computing devices.

11. The system of claim 1 wherein the mobile computing devices comprise one or more smartphones.

12. The system of claim 1 wherein the mobile computing devices comprise one or more tablet computers.

13. A non-transitory computer-readable storage medium encoded with computer instructions, which, when executed by one or more processors, operable to:
    execute a program for playback of a functional test composition comprising a timed sequence of clips on a plurality of mobile computing devices associated with an enterprise, the program executing remotely to each of the mobile computing devices via an Internet communication protocol, the mobile computing devices each having a touch-sensitive display screen operable to receive gesture-based user input during running of a mobile application, the mobile computing devices being geographically distributed across a plurality of different countries running the mobile application, the timed sequence of clips including one or more messages each of which instructs a precise gesture-based action applied to at least one object displayed on the touch-sensitive display screen, each gesture-based action including the precision elements of a previously captured gesture-based user input stored in a memory, each gesture-based action corresponding to a functional aspect of the mobile application, wherein the precision elements include parameters defining changes made to each object affected by the previously captured gesture-based user input, the precision elements having been captured from inside the mobile application while the mobile application was subject to the gesture-based user input entered via the touch-sensitive display screen; and receive test results communicated by each of the mobile computing devices, the test results being generated from the playback of the functional test composition on each of the mobile communication devices.

14. The non-transitory computer-readable storage medium of claim 13 wherein execution of the computer instructions is further operable to aggregate mobile applications metrics from the test results.

15. The non-transitory computer-readable storage medium of claim 13 wherein the parameters comprise start and end point coordinates of a path, and temporal variations of speed, associated with the previously captured gesture-based user input.

16. The non-transitory computer-readable storage medium of claim 15 wherein execution of the computer instructions is further operable to display the aggregated mobile applications metrics in a single graphical view provided on a dashboard screen of a computing device.

17. The non-transitory computer-readable storage medium of claim 15 wherein execution of the computer instructions is further operable to correlate the aggregated mobile applications metrics.

18. A method comprising: executing a program for playback of a functional test composition comprising a timed sequence of clips on a plurality of mobile computing devices associated with an enterprise, the program executing remotely to each of the mobile computing devices via an Internet communication protocol, the mobile computing devices each having a touch-sensitive display screen operable to receive gesture-based user input during running of a mobile application, the timed sequence of clips including one or more messages each of which instructs a precise gesture-based action applied to at least one object displayed on the touch-sensitive display screen, each gesture-based action including the precision elements of a previously captured gesture-based user input stored in a memory, each gesture-based action corresponding to a functional aspect of the mobile application, wherein the precision elements include parameters defining changes made to each object affected by the previously captured gesture-based user input, the precision elements having been captured from inside the mobile application while the mobile application was subject to the gesture-based user input entered via the touch-sensitive display screen; and receiving test results communicated by each of the mobile computing devices, the test results being generated from the playback of the functional test composition on each of the mobile communication devices.

19. The method of claim 18 wherein the mobile computing devices are geographically distributed across a plurality of different countries running the mobile application.

20. The method of claim 18 further comprising aggregating mobile applications metrics from the test results.

21. The method of claim 18 further comprising displaying the aggregated mobile applications metrics in a single graphical view provided on a dashboard screen of a computing device.

22. The method of claim 18 wherein the parameters comprise start and end point coordinates of a path, and temporal variations of speed, associated with the previously captured gesture-based user input.

23. The method of claim 20 further comprising correlating the aggregated mobile applications metrics.

* * * * *